Sept. 2, 1941.　　　S. M. ANDERSON　　　2,254,813
AIR CONDITIONING SYSTEM
Original Filed Dec. 23, 1937
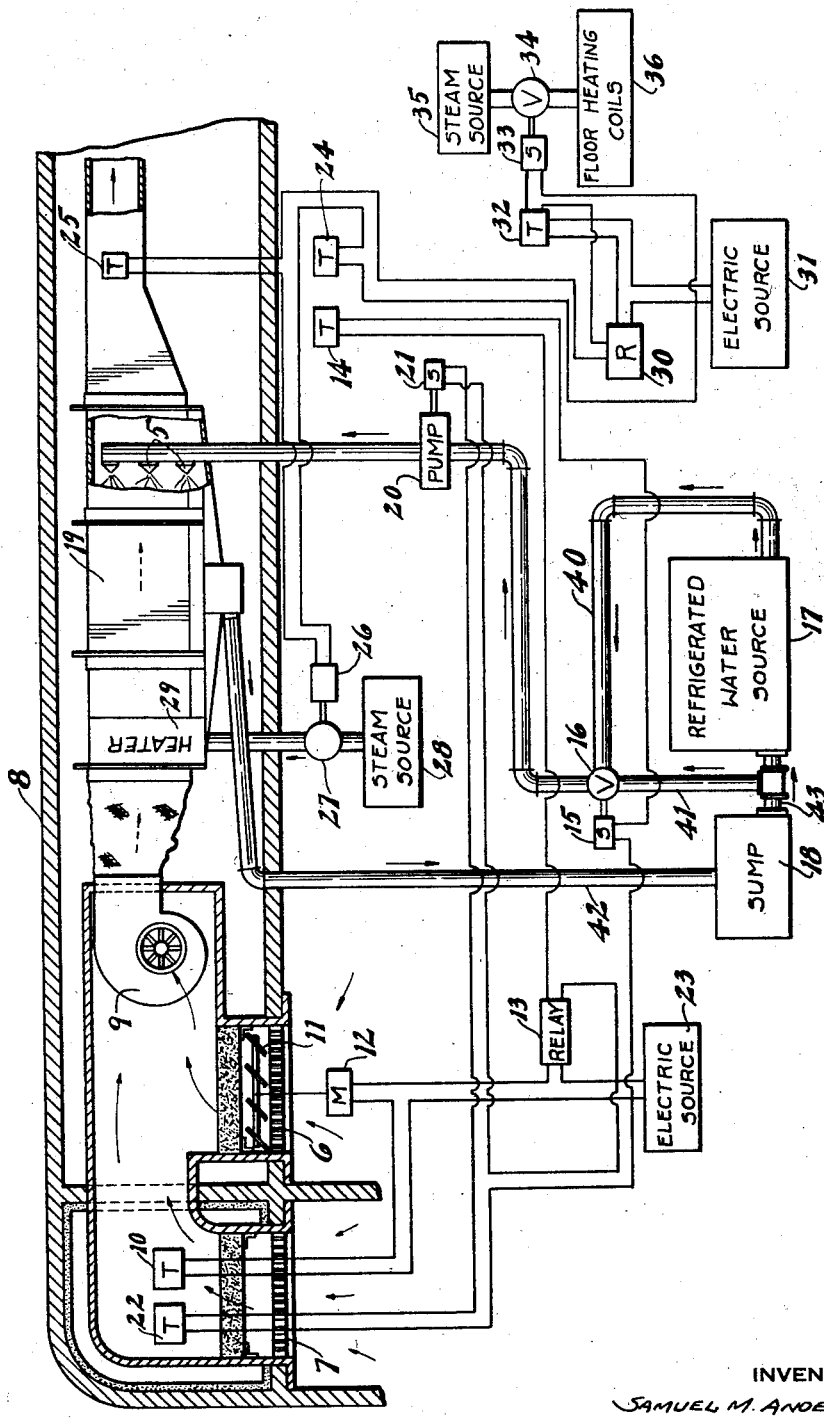
INVENTOR
SAMUEL M. ANDERSON
BY Robert T. Palmer
ATTORNEYS Patented Sept. 2, 1941

2,254,813

UNITED STATES PATENT OFFICE 2,254,813

AIR CONDITIONING SYSTEM

Samuel M. Anderson, Sharon, Mass., assignor to B. F. Sturtevant Company, Hyde Park, Boston, Mass.

Original application December 23, 1937, Serial No. 181,364. Divided and this application May 3, 1939, Serial No. 271,612

1 Claim. (Cl. 236—37)

This invention relates to systems for the conditioning of air and relates more particularly to air washer systems for passenger vehicles.

This application is a division of my application, which issued on July 11, 1939, as Patent No. 2,165,829.

Air conditioning systems utilizing air washers are preferable, it is believed, for passenger vehicles such, for example, as railway passenger cars. The air is cleaned and odors and harmful bacteria are removed. During a large portion of the time evaporative cooling may be employed with resulting saving in refrigeration.

A feature of this invention resides in providing an air washer system in which a wet bulb thermostat adjusts the air control dampers for 100% outdoor air when the wet bulb temperature of the outdoor air is low enough for evaporative cooling to be effective and at the same time adjusts a by-pass around the source of refrigerated water so that during the periods in which evaporative cooling may be effective, the spray water is continuously recirculated. When the wet bulb temperature of the outdoor air rises above 64° F., the dampers are set for say, 75% recirculated and 25% outdoor air and an indoor thermostat is placed in condition to close the by-pass around the source of refrigerated water when the indoor air is too warm and to open the by-pass when the indoor air is too cool.

Another feature of the invention resides in providing one or more thermostats at the output of the air washer, as in an air discharge duct for controlling the addition of heat to the air before it is discharged into the passenger space. One such duct thermostat may set the thermostat for the floor heating coils.

According to another feature of the invention, the sprays are operated continuously except when the temperature of the outdoor air falls to a predetermined minimum at which time the pump supplying water to the spray nozzles, is shut down.

An object of the invention is to provide an effective air washer system for passenger vehicles.

Another object of the invention is to provide an air washer system for passenger vehicles which may be operated in evaporative cooling during warm and mild weather.

Another object of the invention is to provide efficient and effective controls for an air washer system for passenger vehicles. Other objects of the invention will be apparent from the drawing and the description which follows.

The invention will now be described with reference to the drawing which illustrates diagrammatically one embodiment of an air conditioning system for a passenger vehicle, according to this invention.

The blowers 9 and air washer 19 are located in one end of the railway passenger car 8. The blowers 9 draw fresh air through the vestibule grille 7, and recirculated air through the grille 6. The dampers 11 adjusted by the motor 12 control the volume of recirculated air.

The washer 19 contains the heater 29 which is adapted to be supplied with steam from the source 28, the addition of steam being controlled by the valve 27 adjusted by the solenoid 26 under control of the duct thermostat 25.

The washer 19 also contains the spray nozzles 5 supplied with water by the pump 20 which is driven by the motor 21. The suction line of the pump 20 is connected to the three-way valve 16 which in one extreme position connects the pump 20 with the pipe 40 supplying water from the refrigerated water source 17, and in the other extreme position connects the pump 20 with the pipe 41 connecting with the sump 18 and forming a by-pass around the source 17. Return water from the washer 19 flows through the pipe 42 into the sump 18 and then through the pipe 43 into the pipe 41 or into the source 17, depending upon the position of the valve 16.

The floor heating coils 36 are adapted to be supplied with steam as from the steam source 35, the addition of steam being adjusted by the valve 34, adjusted by the solenoid 33 under control of the thermostat 32.

The wet bulb thermostat 10 exposed to the outdoor air entering the system controls the damper motor 12 and cuts the indoor thermostat 14 in and out of control of the solenoid 15 which adjusts the by-pass valve 16.

When the wet bulb temperature of the outdoor air is below, say 64° F., the thermostat 10 closes the dampers 11 by energizing the motor 12 and by energizing the relay 13 to disconnect the thermostat 14 from control of the solenoid 15. This causes the solenoid 15 to become deenergized and to adjust the valve 16 to open the by-pass around the refrigerated water source 17 so as to cause the water between sump 18 and washer 19 to be recirculated in an evaporative cooling cycle. The pump 20 operates continuously so long as the outdoor dry bulb is above 55° F. Below this temperature, the thermostat 22 deenergizes the pump motor 21 to stop the pump 20.

When the wet bulb temperature of the outdoor air is above 64° F., the thermostat 10 opens its contacts to deenergize the motor 12, causing the dampers 11 to open to provide 75% recirculated air with 25% outdoor air. The relay 13 is deenergized and its control contacts close to connect the thermostat 14 in circuit with the solenoid 15 and the electric source 23. The thermostat 14 then acts to open and close the by-pass around the refrigerated water source 17 when the temperature within the passenger space is correct and too high respectively. If the temperature within the car falls too low and the thermostat 14 cannot control this, the thermostat 24 acts at say 72° F., to connect the duct thermostat 25 in circuit with the electric source 31 and with the solenoid 26 controlling the valve 27 in the steam line between the overhead heater 29 and the steam source 28. The thermostat 25 controls the heater 29 to cause the temperature of the air supplied to the car to be at say 75° F. At the same time, the relay 30 is energized to connect the thermostat 32 in circuit with the electric source 31 to enable it to control the solenoid 33 to control the supply of steam from the source 35 to the floor heating coils 36.

While only one duct thermostat has been illustrated and described, other duct thermostats functioning at different temperatures may be used for controlling the heat added to the air in the car.

While one embodiment of the invention has been described for the purpose of illustration, it should be understood that the invention is not limited to the exact apparatus and arrangement of apparatus illustrated and described, since many departures may be suggested by those skilled in the art, without departing from the spirit of the invention.

What is claimed is:

Air conditioning apparatus for a passenger vehicle comprising an overhead air heater, air distributing means for supplying air from said heater into the passenger space, means including a first thermostat exposed to the air in said distributing means for adjusting the effectiveness of said heater, means including a floor heater, a second thermostat for controlling the effectiveness of said floor heater, and means including a third thermostat in said space connected to said first and second thermostats for increasing the effectiveness of said heaters when the temperature in said space falls below a predetermined level.

SAMUEL M. ANDERSON.

CERTIFICATE OF CORRECTION.

Patent No. 2,254,813.  September 2, 1941.

SAMUEL M. ANDERSON.

It is hereby certified that error appears in the printed specification of the above numbered patent requiring correction as follows: Page 2, second column, line 19, in the claim, strike out the words "means including" and insert the same before "a second" in line 20; and that the said Letters Patent should be read with this correction therein that the same may conform to the record of the case in the Patent Office.

Signed and sealed this 28th day of October, A. D. 1941.

(Seal)

Henry Van Arsdale,
Acting Commissioner of Patents.